United States Patent
Stanisic et al.

(10) Patent No.: US 8,549,146 B2
(45) Date of Patent: Oct. 1, 2013

(54) STATELESS FORWARDING OF LOAD BALANCED PACKETS

(75) Inventors: Vladica Stanisic, Denver, CO (US); James Arthur Davis, Longmont, CO (US); Tobias Karlsson, Broomfield, CO (US); Reda Haddad, San Jose, CA (US); Mahmood Hossain, San Jose, CA (US)

(73) Assignee: Telefonaktiebolaget L M Ericsson (publ), Stockholm, Sweken ( * ) Notice: Subject to any disclaimer, the term of this patent is extended or adjusted under 35 U.S.C. 154(b) by 865 days.

(21) Appl. No.: 12/695,957

(22) Filed: Jan. 28, 2010

(65) Prior Publication Data
US 2011/0185065 A1    Jul. 28, 2011

(51) Int. Cl.
  G06F 15/173    (2006.01)
  G06F 15/16    (2006.01)
(52) U.S. Cl.
  USPC .......................................... 709/226; 709/228
(58) Field of Classification Search
  None
  See application file for complete search history.

(56) References Cited

U.S. PATENT DOCUMENTS

| 2006/0101159 A1* | 5/2006 | Yeh et al. ....................... 709/246 |
| 2007/0258463 A1* | 11/2007 | Rhoades et al. .......... 370/395.52 |
| 2009/0265467 A1* | 10/2009 | Peles ............................. 709/226 |
| 2010/0325280 A1* | 12/2010 | Jindal et al. ................... 709/226 |

FOREIGN PATENT DOCUMENTS

WO    WO-2006107249    10/2006

OTHER PUBLICATIONS

Stewart, R., et al., "Stream Control Transmission Protocol", Standard Track, RFC 2960, Oct. 2000, Internet at: http://www.ietf.org/rfc/rfc2960.txt, (120 pages).

* cited by examiner

Primary Examiner — Umar Cheema
(74) Attorney, Agent, or Firm — Blakely, Sokoloff, Taylor & Zafman

(57) ABSTRACT

A load balancer dynamically load balances packets for network connections between clients and servers. When receiving a packet from a client that requests a new connection, the load balancer checks the current load of all the servers and selects the server most suitable to handle the new connection. The load balancer then forwards that packet to the selected server. If the server accepts the request for the new connection, then the server responds with an acknowledgement packet. The acknowledgement packet also includes the server's blade identification that the client uses for all subsequent packets on the accepted connection. When the load balancer receives a packet containing the blade identification, the load balancer forwards the packet to the server corresponding to the blade identification. Backup load balancers can therefore continue packet forwarding services in a smooth and efficient manner.

21 Claims, 7 Drawing Sheets

STATELESS FORWARDING OF LOAD BALANCED PACKETS

BACKGROUND

1. Field

Embodiments of the invention relate to the field of traffic management; and more specifically, to the stateless forwarding of load balanced packets between clients and servers.

2. Background

In a transport protocol such as Stream Control Transmission Protocol (SCTP), Transmission Control Protocol (TCP), and User Datagram Protocol (UDP), packets are transmitted between clients and servers. One or more load balancers are positioned between the clients and servers to forward the packets. The load balancers can operate in various manners to handle packet routing. A blade is a combination of hardware and software that can act as a server and/or a client. A load balancing site is a system that includes one or more load balancers and multiple blades.

One approach to managing packets is a stateful approach using a table. To forward packets, the load balancer refers to a table to determine which blade an incoming packet to the load balancing site should forwarded to, based on which connection the packet is associated with. The table keeps a record of previous load balancing decisions of connections mapped to blades. Thus, the load balancer routes subsequent packets incoming to the load balancing site on established connections to the assigned blade in accordance with the table. For example, the table may indicate that the connection identified by "5 tuple" is mapped to the blade identified by the blade's Internet Protocol (IP) address. Therefore, when the load balancer receives an incoming packet from outside of the load balancing site on the connection "5 tuple," then the load balancer forwards that packet to the blade marked in the table as mapped to the connection "5 tuple."

The table-based approach to packet management has various disadvantages. Extra time and resources are required to record, maintain, and search within the table that maps the blades to connections. As more connections are established, the size of the table increases as well. In addition, if the table is lost, load balancers are not able to continue consistent routing because they do not have the information that identifies to which blades the load balancers should route the packets. Further, for a secondary load balancer to take over for a primary load balancer, the secondary load balancer also maintains its own copy of the table so that it can route packets consistent with the primary load balancer when the primary load balancer fails. However, if the secondary load balancer's table is inconsistent with the primary load balancer's table, then the secondary load balancer does not route packets consistently with the primary load balancer.

Another approach to managing packets is a stateless approach using a hash function. A load balancer applies a hash function to a connection identifier of a packet to determine to which blade the packet should be routed. For example, a load balancing site may contain N blades. To determine which of the N blades should receive an incoming packet, the hash function by the load balancer takes the source IP address of the packet as an integer and performs a modulo N of that integer. The result is an integer between 0 and $N-1$; the load balancer thus routes the packet to one of the N blades mapped to the blade identifier (ID) of 0 through $N-1$.

While the hash-based approach is stateless, it has other disadvantages. Load distribution based on a hash function does not take into account dynamic and adaptive characteristics of the blades. Traffic characteristics of the connections, such as lifetime and arrival rate, are not taken into consideration by a hash function. Adding or removing blades from the load balancing site changes a variable of the hash function. As a result, asymmetric load balancing among the blades can occur.

In view of the above, a more efficient and reliable approach to load balancing would improve connection stability for clients and servers.

SUMMARY

A load balancing site including load balancers and blades approaches load balancing by utilizing a blade ID of each individual blade. During establishment of a server connection between a client external to the load balancing site and a blade acting as a client, the client sends an initialization request to a load balancer. The load balancer identifies the current load on each of the blades in the load balancing site and selects one of the blades most suitable to pass on the initialization request. Dynamically evaluating the current load on the blades prior to forwarding the initialization request allows the load balancer to more evenly distribute traffic among all the blades of the load balancing site and avoid overloading any particular blade.

Upon receiving the initialization request forwarded by the load balancer, the blade creates an acknowledgement packet to accept the request for a server connection from the client. The blade includes an identification tag in the acknowledgement packet, which includes, at least in part, its blade ID. This blade ID uniquely identifies to the load balancer which blade among all the blades is hosting this particular server connection with the client. Subsequent packets on this server connection sent from the client will include this blade ID. Therefore, when a load balancer receives a packet from a client that includes the blade ID, it knows which blade to forward the packet to. By referring to blade IDs directly in the packets, the load balancer no longer needs to maintain and reference a state table as described in the Background to identify which blade corresponds to which connection. Moreover, the load balancer is able to dynamically control load balancing by considering the current load at the time of load evaluation, rather than being guided by a hash function that is unaware of current load conditions.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
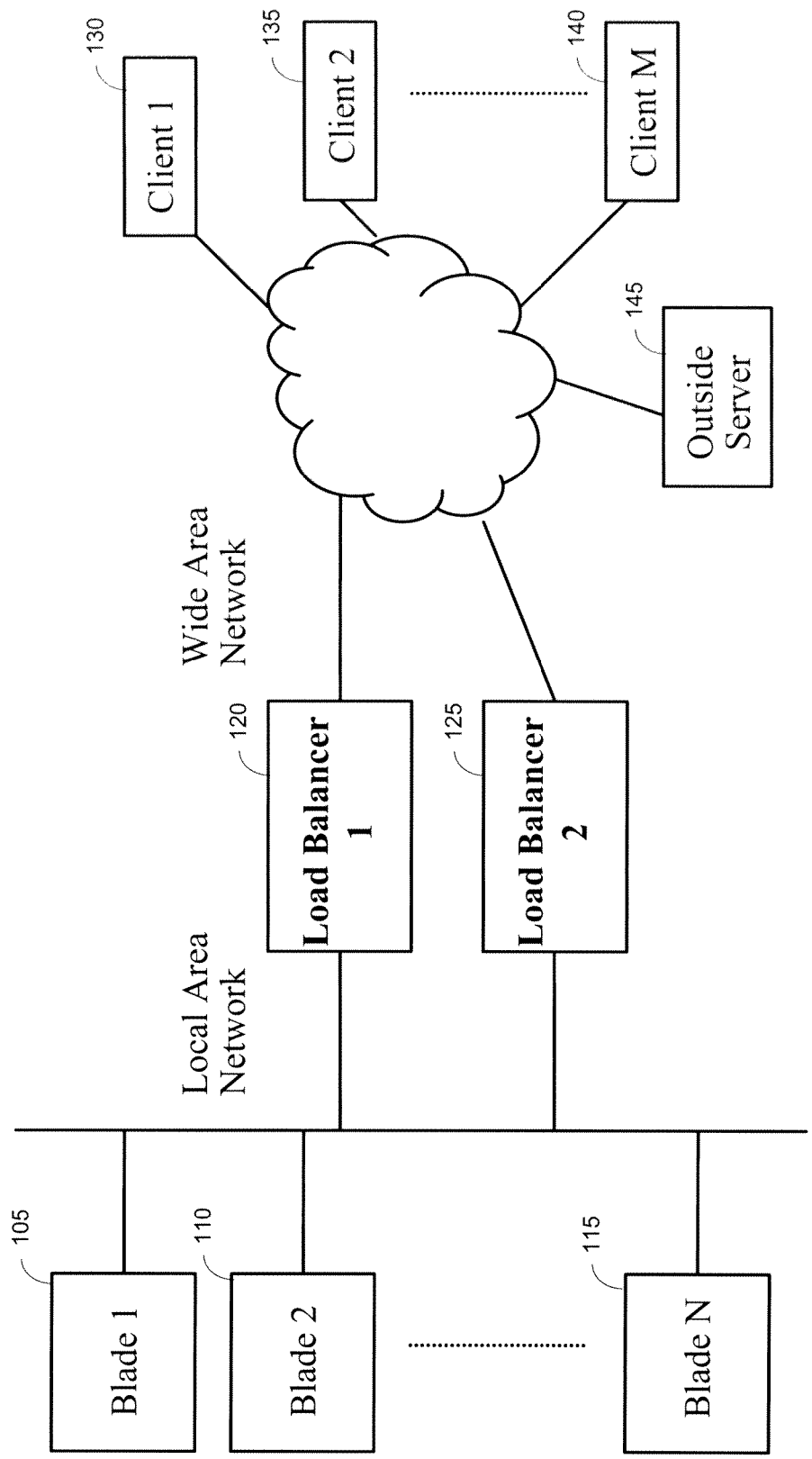
FIG. 1 illustrates an exemplary system supporting the use of load balancing according to one embodiment of the invention.

In the following description, numerous specific details are set forth. However, it is understood that embodiments of the invention may be practiced without these specific details. In other instances, well-known circuits, connections, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, palm tops, mobile phones, smart-phones, multimedia phones, Voice Over Internet Protocol (VOIP) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Some network elements include functionality for AAA (authentication, authorization, and accounting) protocols (e.g., RADIUS (Remote Authentication Dial-In User Service), Diameter, and/or TACAS+ (Terminal Access Controller Access Control System). AAA can be provided through a client/server model, where the AAA client is implemented on a network element and the AAA server can be implemented either locally on the network element or on a remote end station (e.g., server end station) coupled with the network element. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network element (supporting AAA processing) coupled to core network elements coupled to server end stations of service/content providers. AAA processing is performed to identify the subscriber record for a subscriber. A subscriber record includes a set of attributes (e.g., subscriber name, password, authentication information, access control information, rate-limiting information, policing information, etc.) used during processing of that subscriber's traffic.

Certain network elements (e.g., certain edge network elements) internally represent subscriber end stations (or sometimes customer premise equipment (CPE) such as a residential gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, ATM, etc. A subscriber session can be initiated using a variety of mechanisms: manual provisioning a dynamic host configuration protocol (DHCP), DHCP/client-less internet protocol service (CLIPS), Media Access Control (MAC) address tracking, etc. For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

Certain network elements (e.g., certain edge network elements) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end stations to the network element. These parent circuits may represent physical or logical aggregations of subscriber circuits (e.g., a virtual local area network (VLAN), a private virtual circuit (PVC) (e.g., for Asynchronous Transfer Mode (ATM)), a circuit-group, a channel, a pseudo-wire, a physical port of the network element, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical ports for purposes of bandwidth aggregation and redundancy. Thus, the parent circuits physically or logically encapsulate the subscriber circuits.

Some network elements support the configuration of multiple contexts. As used herein, each context includes one or more instances of a virtual network element (e.g., a virtual router, a virtual bridge (which may act as a virtual switch instance in a Virtual Private LAN Service (VPLS)). Each context typically shares system resources (e.g., memory, processing cycles, etc.) with other contexts configured on the network element, yet is independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple contexts may be employed in an edge network element to provide direct network access and/or different classes of services for subscribers of service and/or content providers.

Within certain network elements, multiple "interfaces" may be configured. As used herein, each interface is a logical entity, typically configured as part of a context, which provides higher-layer protocol and service information (e.g., Layer 3 addressing) and is independent of physical ports and circuits (e.g., ATM PVC (permanent virtual circuits), 802.1Q VLAN circuits, QinQ circuits, DLCI circuits, etc.). The subscriber records in the AAA server identify, in addition to the other subscriber configuration requirements, to which context (e.g., which of the virtual routers) the corresponding subscribers should be bound within the network element. As used herein, a binding forms an association between a physical entity (e.g., port, channel, etc.) or a logical entity (e.g., circuit (e.g., subscriber circuit, logical circuit (a set of one or more subscriber circuits), etc.), etc.) and a context's interface over which network protocols (e.g., routing protocols, bridging protocols) are configured for that context. Subscriber data flows on the physical entity when some higher-layer protocol interface is configured and associated with that physical entity.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms.

FIG. 1 illustrates an exemplary system supporting the use of load balancing according to one embodiment of the invention. A load balancing site includes blades 105, 110, 115 that are capable as acting as a server, client, or both. The load balancing site also includes one or more load balancers 120,

125 to handle packet routing and balance the load among the blades 105, 110, 115. External to the load balancing site are clients 130, 135, 140 that can have server connections with blades 105, 110, 115. One or more outside servers 145 can also have connections with blades 105, 110, 115 (as blades can also act as clients).

When a client 130, 135, 140 wishes to establish a network connection, it creates a packet containing a request for the network connection. Load balancer 120 receives this packet. In one embodiment, load balancer 125 shares load balancing tasks with load balancer 120. In another embodiment, load balancer 125 serves as a standby load balancer to take over when load balancer 120 fails. Upon receiving the packet, load balancer 120 determines whether the packet is a packet that contains a request to initiate a server connection or a packet that is on an already established connection.

If the packet contains a request to initiate a server connection, the load balancer 120 identifies a current load on each of the blades of the load balancing site. This allows the load balancer 120 to utilize relevant information in determining which blade should be selected for the server connection. The careful and dynamic selection aims to more evenly distribute traffic among the blades of the load balancing site so that no particular blade is overloaded. The load balancer 120 then forwards the packet to the blade it selected based on its load compared to the loads of other blades. For example, load balancer 120 may select blade 105 for this particular server connection. Upon receiving the packet from load balancer 120, blade 105 then creates an acknowledgement packet. The acknowledgement packet accepts the request for the server connection from the client that sent the request. In the acknowledgment packet, blade 105 inserts an identification tag. Typically, if a blade utilizes an identification tag, it is a random value that provides an additional verification of packets from clients to the blades. Now, this identification tag contains at least in part the blade ID of blade 105 and therefore has a unique meaning For example, the one part of the identification tag may be filled with the blade ID and the remaining bits of the identification tag can be filled with a random value. The blade ID serves to identify to the load balancers 120, 125 that blade 105 is hosting this server connection.

Blades 105, 110, 115 may be collectively assigned to just one IP address so that the plurality of blades appears as only a single node to devices external to the load balancing site, e.g., clients 130, 135, 140 and outside server 145. In other words, only the load balancers 120, 125 are aware of how many blades exist and which blades correspond to which blade IDs. As far as clients 130, 135, 140 are concerned, the specific value in the identification tag of the acknowledgement packet is meaningless. In one embodiment, blade IDs may be represented by the respective blades' own IP address. These IP address are hidden from devices external to the load balancing site with a virtual IP address so that the blades may appear as a single node.

Blade 105 sends the acknowledgement packet to the client via load balancer 120. The client is to insert into all subsequent packets for the server connection just accepted by blade 105 the specific identification tag found in the acknowledgement packet.

Accordingly, the other type of packet load balancer 120 may receive from a client is a packet that is on an already established connection. As noted above, if a client sends a packet that is on an already established connection, this packet will include the value of the identification tag inserted by a blade in an acknowledgement packet. Thus, to determine which blade to forward the packet from a client, load balancer 120 reads the identification tag in the packet to determine the blade ID. Load balancer 120 therefore forwards the packet to the blade corresponding to the blade ID. Reading the blade ID directly from the packet that is being forwarded allows the load balancer to avoid storing and referencing a mapping table that maintains a mapping of blades and connections.

Figure 2:
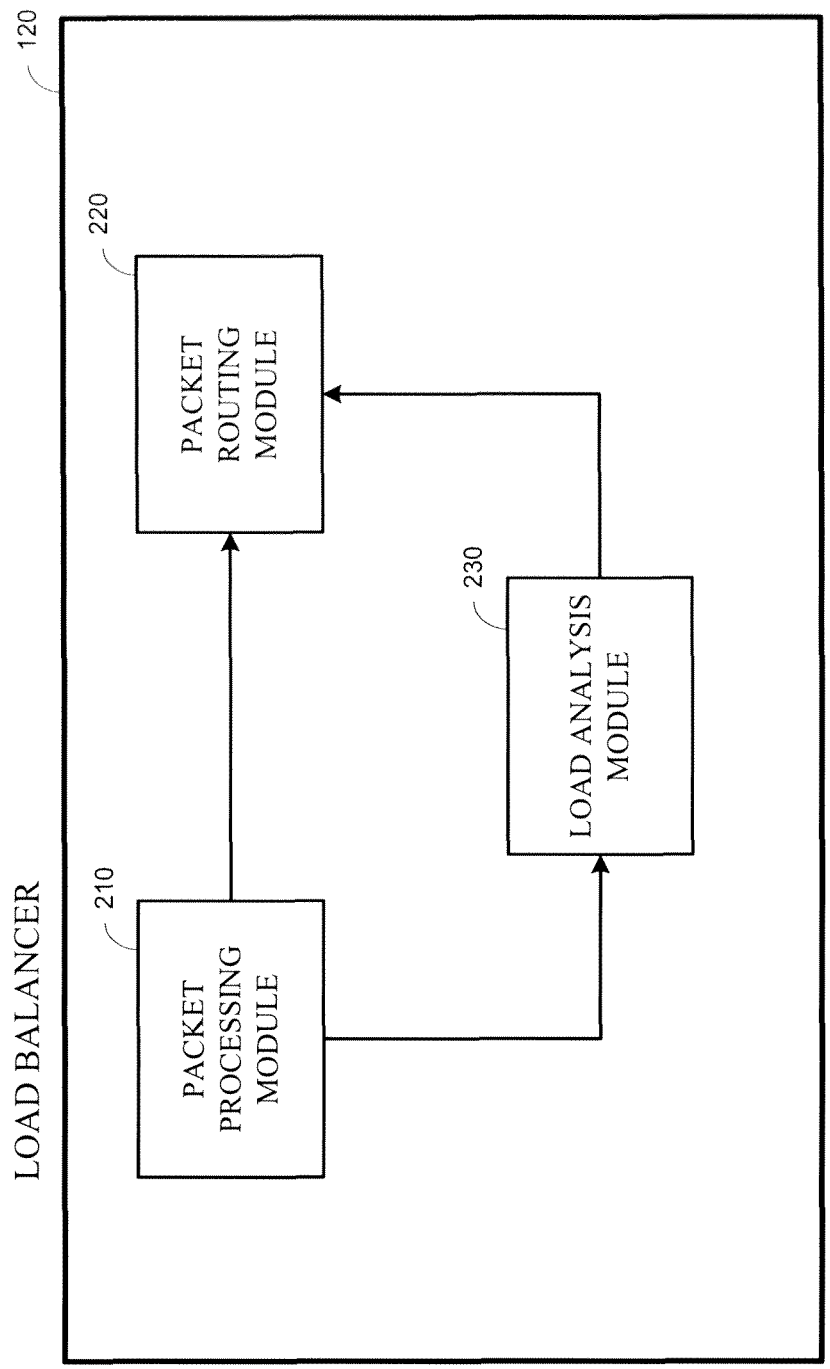
FIG. 2 illustrates an exemplary load balancer according to one embodiment of the invention.

FIG. 2 illustrates an exemplary load balancer according to one embodiment of the invention. Load balancer 120 is one of possibly multiple load balancers of the load balancing site. Other load balancers may serve as backup to take over for load balancer 120 in the event of a failure. Load balancer 120 manages packet routing between blades acting as clients and/or servers internal to the load balancing site and devices (e.g., clients and outside servers) external to the load balancing site. For packets from clients external to the load balancing site that contain requests to establish new server connections, load balancer 120 selects which blade should receive the request.

Load balancer 120 includes packet processing module 210, packet routing module 220, and load analysis module 230. These modules work together to process packets transmitted from devices internal to the load balancing site (e.g., blades) to devices external to the load balancing site (e.g., clients and outside servers), and vice versa. Packet processing module 210, packet routing module 220, and load analysis module 230 are all involved when load balancer 120 receives a packet from an external client that contains a request to establish a new server connection. This packet may come from either a client external to the load balancing site or a blade acting as a client internal to the load balancing site. Only packet processing module 210 and packet routing module 220 are involved when load balancer 120 receives a packet from an external client that is on an already established server connection because load balancer 120 does not need to analyze loads to determine which blade should receive the packet. Similarly, when load balancer 120 receives a packet from a blade, standard packet processing procedures occur because load balancer 120 has no control over implementation of devices outside the load balancing site.

Packet processing module 210 is responsible for processing all the packets received by load balancer 120. Processing incoming packets includes identifying which device sent the packet and distinguishing between packets that contain requests to initiate server connections and packets that are on established server connections. Packets from clients external to the load balancing site that contain a request to initiate a server connection trigger the involvement of load analysis module 230. All other types of packets do not require the load analysis module 230 to be invoked.

Load analysis module 230 analyzes the respective loads of the blades in the load balancing site when load balancer 120 receives a packet from an external client with a request to initiate a server connection. Based on this information, load analysis module 230 selects the blade most suitable to handle the connection requested by the client. For example, load analysis module 230 may select the blade carrying the lightest load at the time of the load analysis. Since load analysis module 230 analyzes the loads of the blades upon receipt of the packets, load balancing is performed dynamically based on current load conditions. Load analysis module 230 can avoid overloading any one particular blade by evenly distributing server connection loads among all the blades.

Packet routing module 220 is coupled to both packet processing module 210 and load analysis module 230. Packet routing module 220 routes packets to the appropriate destination. The destination is identified either by the packet itself or load analysis module 230. For instance, when a client sends a packet on an already established connection, the client inserts a blade ID in the packet. Packet routing module 220 therefore routes the packet to the blade associated with the blade ID. Accordingly, packet routing module 220 routes the packet to the intended recipient without a need to reference a table that identifies mapping information of connections to blades. In another example, when a client sends a packet seeking to initiate a server connection, load balancer 120 has the option to route the packet to any one of multiple blades in the load balancing site. In this situation, load analysis module 230 selects the blade to receive the packet and provides instructions to packet routing module 220 to route the packet to that blade. In other instances, packet routing module 220 is also equipped with standard packet routing procedures, such as for handling packets from a blade that contain a request to initiate a connection with an outside server external to the load balancing site.

Figure 3:
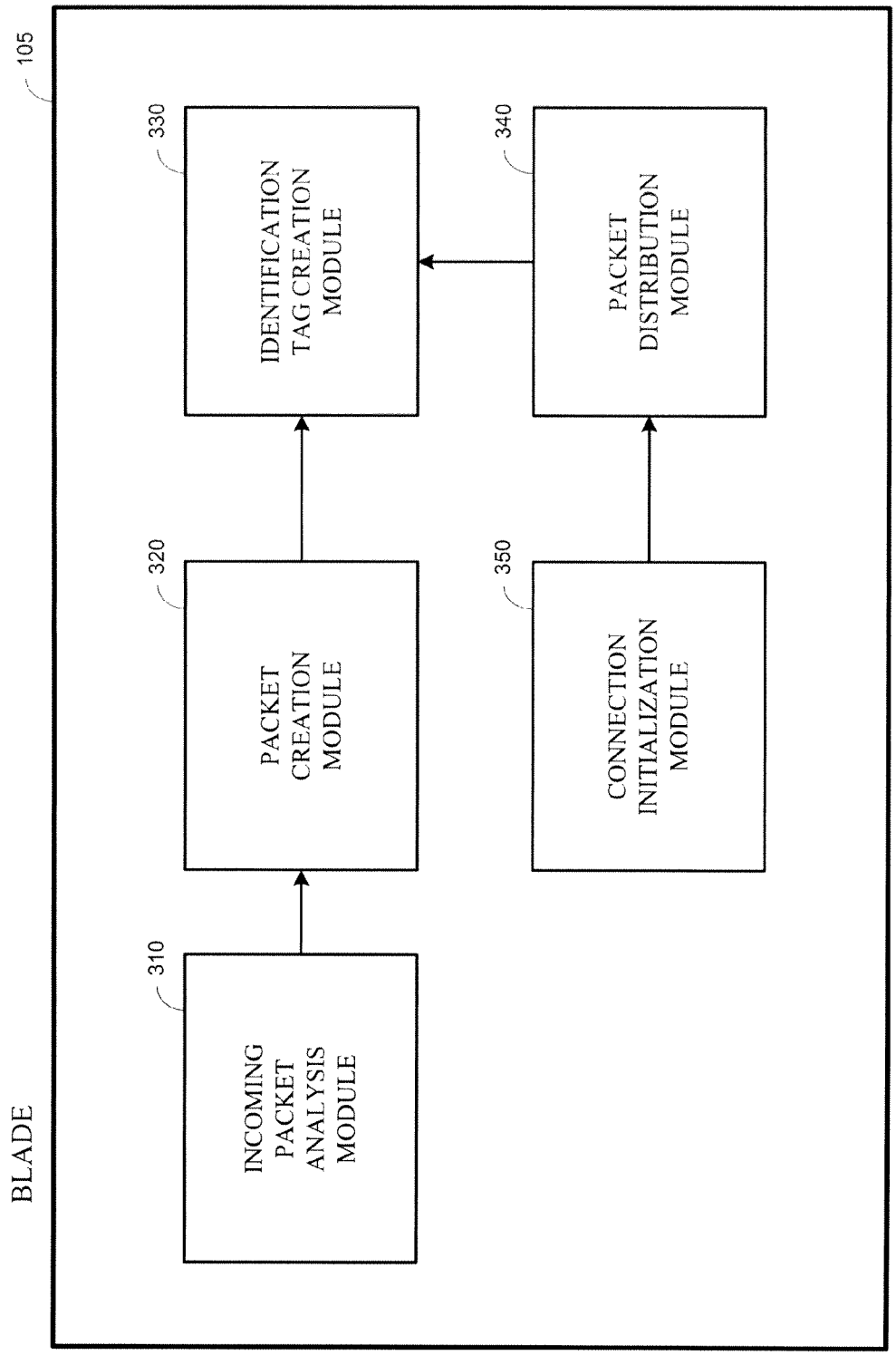
FIG. 3 illustrates an exemplary blade according to one embodiment of the invention.

FIG. 3 illustrates an exemplary blade according to one embodiment of the invention. Blade 105 is one of possibly multiple blades in a load balancing site. Blade 105 is one end of a connection with a device external to the load balancing site; the other end being either a client or an outside server. Blade 105 may act as a server to a client external to the load balancing site, as a client to an outside server external to the load balancing site, or as both server and client. Blade 105 hosts both client applications and server applications.

Incoming packet analysis module 310, packet creation module 320, identification tag creation module 330, and packet distribution module 340 act in response to the packets received by blade 105. Incoming packet analysis module 310 receives packets from a client or outside server via a load balancer. Incoming packet analysis module 310 determines the type of packet received and the course of action to take. For example, if the received packet requests a new server connection, incoming packet analysis module 310 determines whether blade 105 should accept the request. Packet creation module 320 creates packets in response to received packets on already established connections. Packet creation module 320 also creates acknowledgement packets that accept requests from clients to initiate server connections. These acknowledgement packets include an identification tag. Identification tag creation module 330 creates these identification tags but adding a blade ID of blade 105 to the identification tags. For example, part of the identification tag may be the blade ID and the remainder of the identification may be random values selected by the identification tag creation module 330. Regardless of what value is in the identification tag, clients who receive an acknowledgment packet containing an identification tag are to utilize this identification tag for all subsequent packets on the server connection accepted by blade 105. The clients need not be aware of what the identification tag represents. The clients may not even be aware of how many blades are in the load balancing site, but rather views them all as just a single node when the blades are collectively assigned to one IP address. The blade ID in the identification tag identifies the blade to the load balancers so that the load balancers are able to route subsequent packets from devices external to the load balancing site to the appropriate blade. Packet distribution 340 sends the packets containing identification tags to clients and outside servers via the load balancers.

When blade 105 desires a server connection with an outside server, connection initialization module 350 and packet distribution module 340 create and send a packet that requests the connection. Connection initialization module 350 creates an initialization packet that contains a request for a server connection with an outside server external to the load balancing site. Connection initialization module 350 includes an identification tag in the initialization packet. This identification tag contains at least the blade ID of blade 105. Thus, devices external to the load balancing site include this identification tag in packets transmitted on the connection that was requested by blade 105. When the load balancer receives a packet from devices external to the load balancing site, including outside servers, the load balancer is able to route the packet to the appropriate blade according to the blade ID identified by the packet. For example, blade 105 requests a connection and an outside server accepts. When the outside server sends a packet on this connection, the outside server includes an identification of the blade ID of blade 105. The load balancer that receives this packet from the outside server knows to route the packet to blade 105 because of the blade ID. Packet routing by the load balancer occurs efficiently because there is no need to maintain a table to track which blade should receive which packet.

Figure 4:
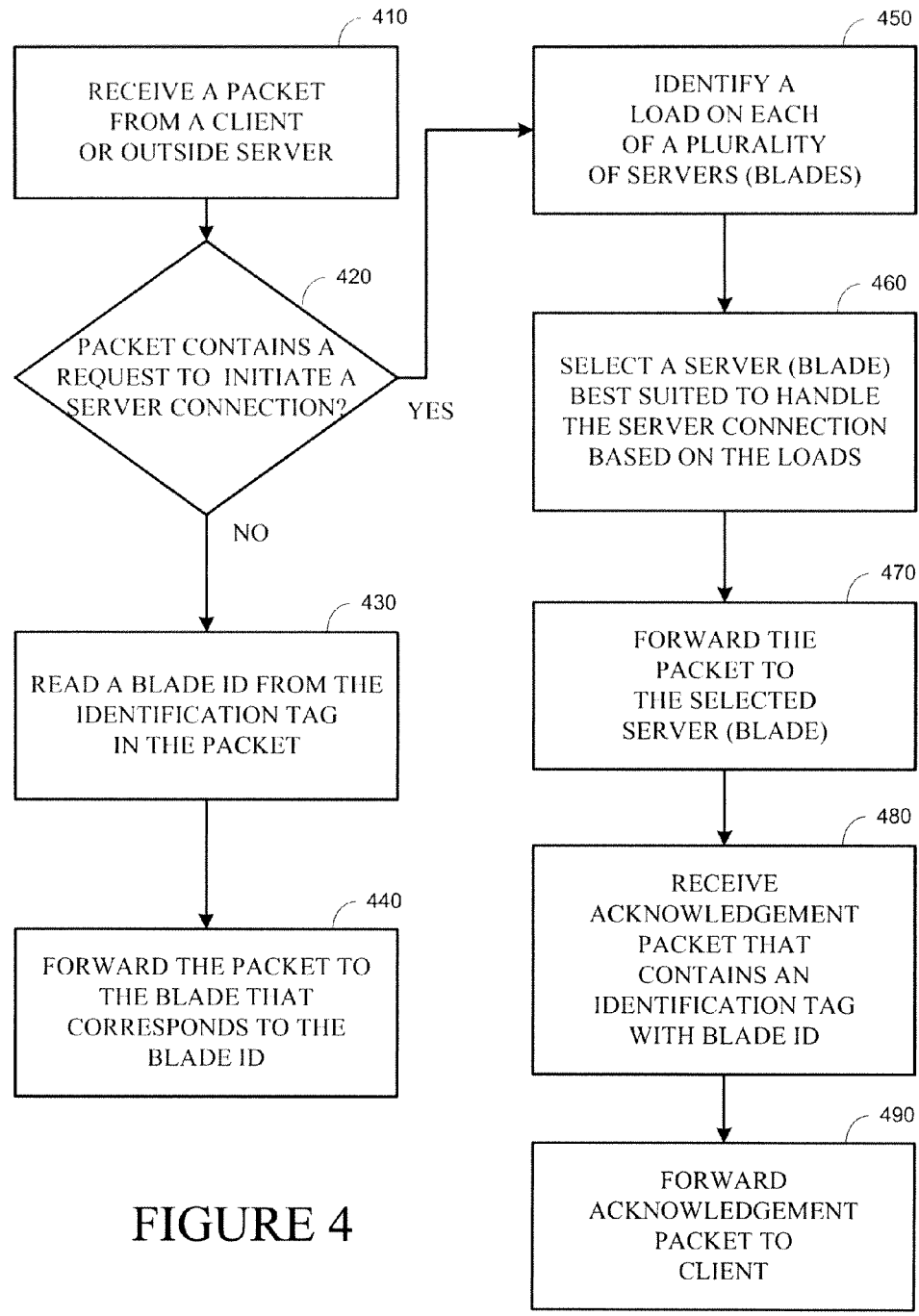
FIG. 4 is a data flow diagram of a load balancer according to one embodiment of the invention.

FIG. 4 is a data flow diagram of a load balancer according to one embodiment of the invention. The operations of FIG. 4 will be described with reference to the exemplary embodiment of FIG. 1. However, it should be understood that the operations of flow diagrams can be performed by embodiments of the invention other than those discussed with reference to FIG. 1, and the embodiments discussed with reference to FIG. 1 can perform operations different than those discussed with reference to the flow diagrams.

At operation 410, load balancer 120 receives a packet from a device external to the load balancing site, such as client 130, 135, 140 or outside server 145. At operation 420, load balancer 120 determines whether the packet contains a request to initiate a server connection. If the packet does not contain a request to initiate a server connection, then the packet is on an already established connection. If the packet is on an already established connection, then the packet will have an identification tag that includes a blade ID. Load balancer 120 reads the blade ID from the identification tag in the packet (operation 430). Load balancer 120 then forwards the packet to the blade that corresponds to the blade ID (operation 440). Accordingly, load balancer 120 obtains forwarding information directly from each of the packets that are being forwarded to the blades.

Returning to operation 420, if the packet received by load balancer 120 contains a request to initiate a server connection, then load balancer 120 proceeds to identify a load on each of a plurality of blades in the load balancing site that can act as a server for the connection (operation 450). At operation 460, load balancer 120 selects one of the blades that is best suited to handle the server connection based on the loads identified in operation 450 and forwards the packet to the selected blade (operation 470). After some time for processing of the packet by the selected blade, load balancer 120 receives an acknowledgement packet from the blade that contains an identification tag with the blade ID of the blade (operation 480). At operation 490, load balancer 120 forwards the acknowledgement packet to the client that sent the initial packet containing the connection request. The acknowledgement packet confirms to the client that the blade accepts the connection request.

Figure 5:
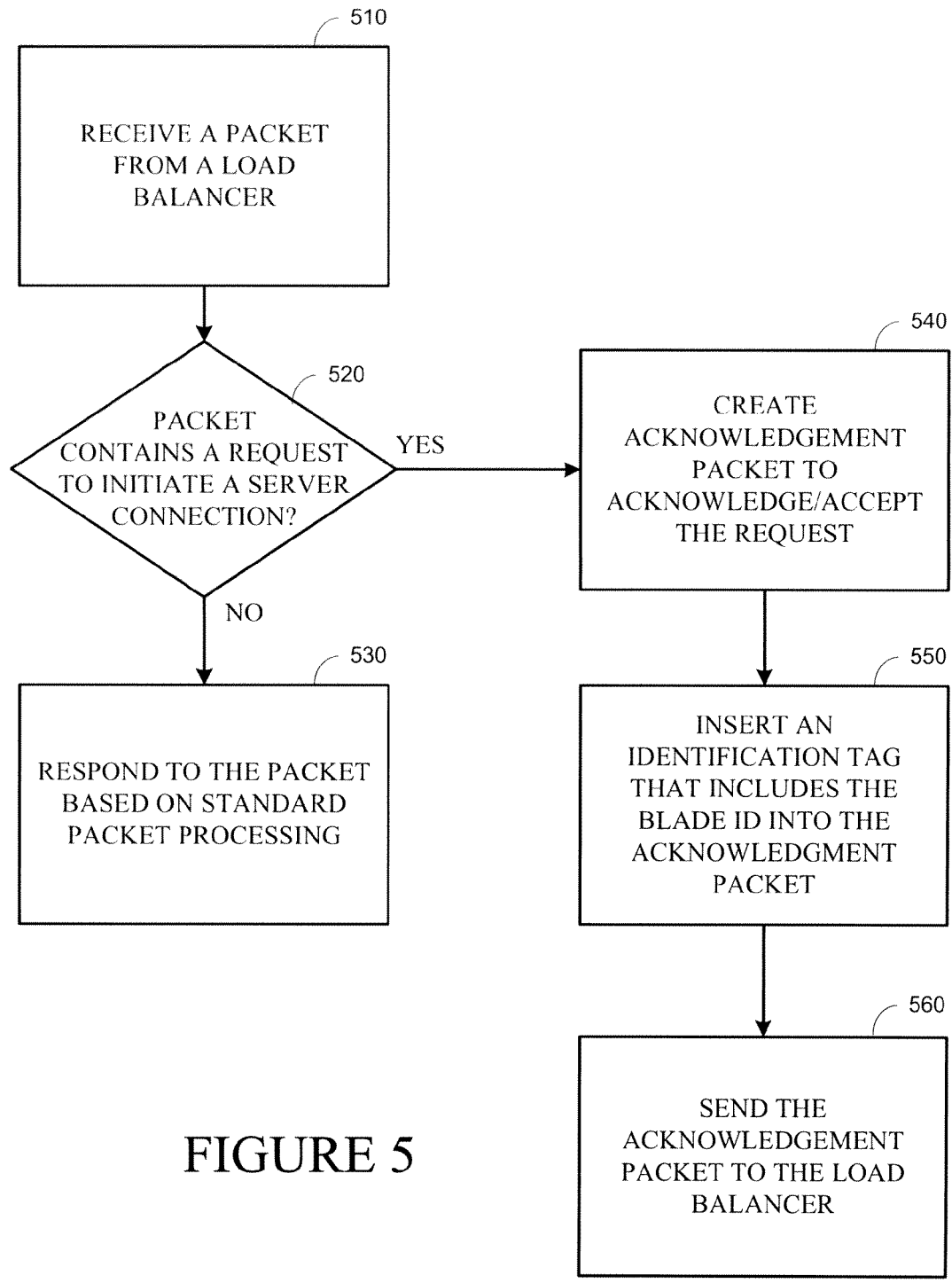
FIG. 5 is a data flow diagram of a blade according to one embodiment of the invention.

FIG. 5 is a data flow diagram of a blade according to one embodiment of the invention. This flow diagram describes the acts taken by a blade in response to incoming packets. The operations of FIG. 5 will be described with reference to the exemplary embodiment of FIG. 1. However, it should be understood that the operations of flow diagrams can be performed by embodiments of the invention other than those discussed with reference to FIG. 1, and the embodiments discussed with reference to FIG. 1 can perform operations different than those discussed with reference to the flow diagrams.

At operation 510, blade 165 receives a packet from load balancer 120. At operation 520, blade 165 determines whether the packet contains a request to initiate a server connection. Packets that contain a request to initiate a server connection are sent by clients external to the load balancing site. If the packet does not contain a request to initiate a server connection, then it is a packet on an already established connection either from a client or an outside server, both external to the load balancing site. For these packets, blade 165 responds to the packet based on standard packet processing (operation 530).

Returning to operation 520, if the packet received by blade 165 contains a request to initiate a server connection, then blade 165 accepts or denies the request. To communicate to the client that blade 165 accepts the request, blade 165 creates an acknowledgement packet (operation 540). The acknowledgement packet includes an identification tag, which includes at least in part the blade ID of blade 165 (operation 550). At operation 560, blade 165 sends the acknowledgement packet to the load balancer (so that load balancer 120 can forward it to the client that sent the connection request). Later packets that blade 165 receives from this client will also include the identification tag, which signals to load balancer 120 that it should forward that packet to blade 165).

Figure 6:
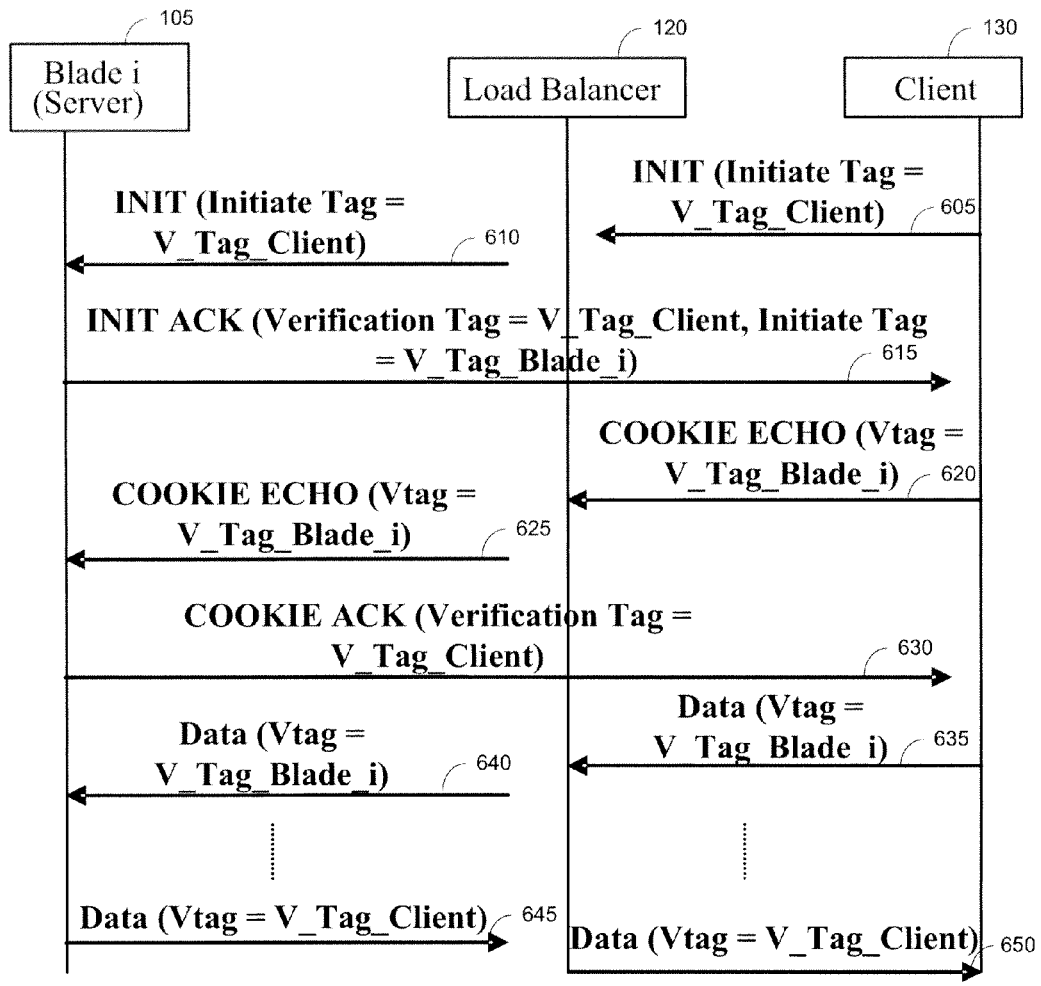
FIG. 6 is a data flow diagram illustrating an SCTP connection initiated by a client according to one embodiment of the invention.

FIG. 6 is a data flow diagram illustrating an SCTP connection initiated by a client according to one embodiment of the invention. The operations of FIG. 6 will be described with reference to the exemplary embodiment of FIG. 1. However, it should be understood that the operations of flow diagrams can be performed by embodiments of the invention other than those discussed with reference to FIG. 1, and the embodiments discussed with reference to FIG. 1 can perform operations different than those discussed with reference to the flow diagrams. FIG. 6 indicates the SCTP connection (association) establishment and exchange of data (with the verification tag) among the client, load balancer and the blade server for the case where the connection is initiated by a client.

As can be seen in FIG. 6, client 130 sends an INIT packet with Initiate Tag value V_Tag_Client to load balancer 120 (operation 605). Load balancer 120 receives the INIT packet and sends it to an available blade server, Blade Server "i" 105, based on a scheduling algorithm (e.g. Weighted Round Robin) (operation 610).

Blade Server "i" 105 receives the INIT packet and generates a cookie and a verification tag value, V_Tag_Blade_i. Then blade server "i" 105 sends back an INIT ACK packet including the cookie and the verification tag (V_Tag_Client), and intitate tag (V_Tag_Blade_i) to load balancer 120 (operation 615). The verification tag value of this packet is V_Tag_Client. Here V_Tag_Blade_i is an initiate tag value which is a function of the Blade ID (The Blade ID is easily and uniquely recoverable from the verification tag, V_Tag_Blade_i). The load balancer 120 receives the INIT ACK packet and forwards it to its next IP hop based on standard routing (operation 615). Then client receives the INIT ACK packet from load balancer 120.

The client 130 echoes the cookie in COOKIE ECHO message and includes the verification tag, V_Tag_Blade_i in the message sent to load balancer 120 (operation 620). The load balancer 120 identifies the COOKIE ECHO message as a non-INIT packet and extracts the Blade ID information from the verification tag field of the packet (V_Tag_Blade_i) and forwards the packet to Blade Server "i" 105 (operation 625).

The Blade Server "i" 105 receives the COOKIE ECHO message and sends a COOKIE ACK message back with the verification tag, V_Tag_Client to client 130 via load balancer 120 (operation 630).

After the connection establishment phase, client 130 sends data packets with the verification tag, V_Tag_Blade_i, and load balancer 120 is able to forward the packets to the appropriate blade by extracting the Blade ID from the verification tag field without keeping any state table (operations 635, 640, 645, 650).

Figure 7:
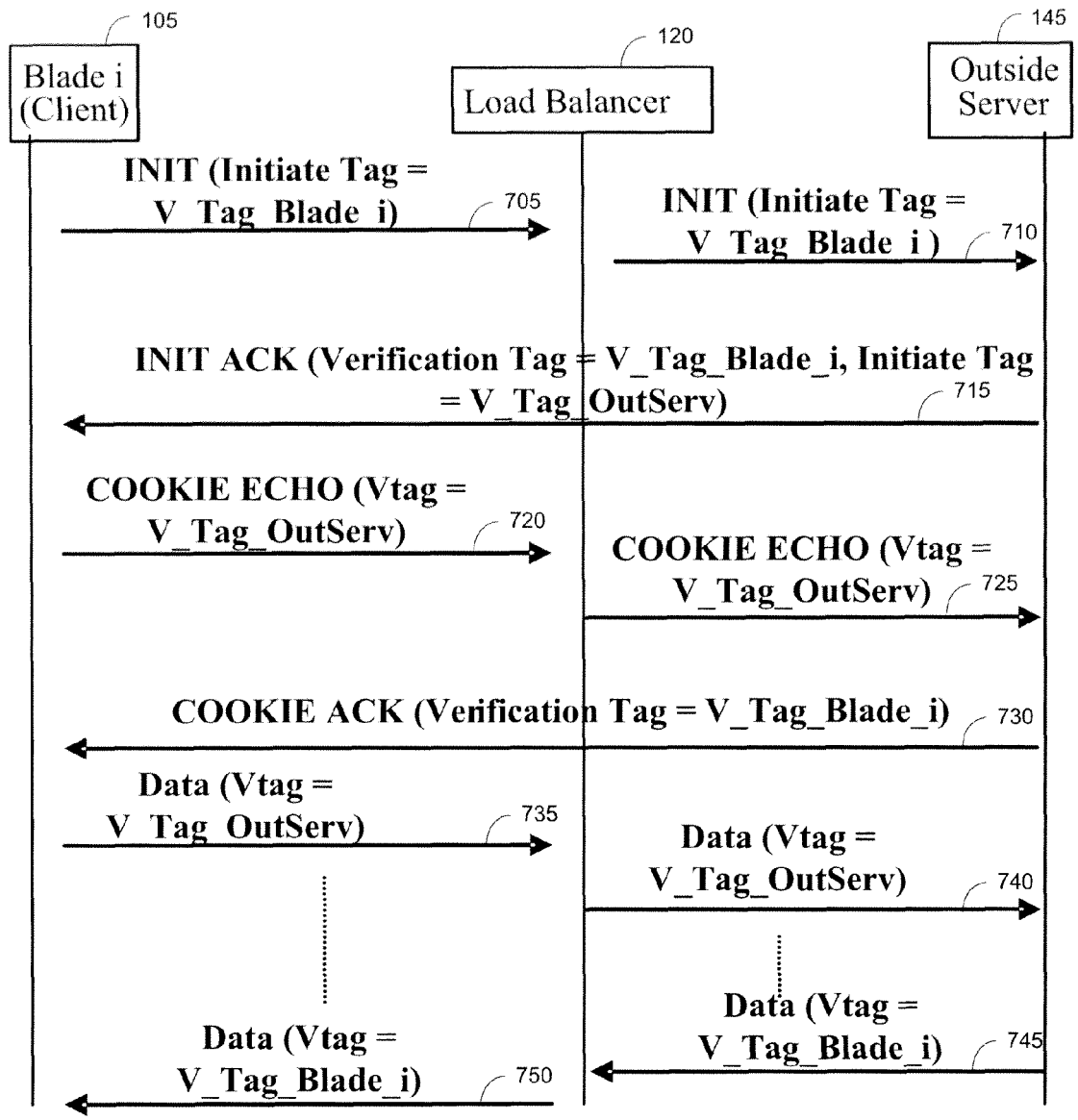
FIG. 7 is a data flow diagram illustrating an SCTP connection initiated by a blade acting as a client according to one embodiment of the invention.

FIG. 7 is a data flow diagram illustrating an SCTP connection initiated by a blade acting as a client according to one embodiment of the invention. The operations of FIG. 7 will be described with reference to the exemplary embodiment of FIG. 1. However, it should be understood that the operations of flow diagrams can be performed by embodiments of the invention other than those discussed with reference to FIG. 1, and the embodiments discussed with reference to FIG. 1 can perform operations different than those discussed with reference to the flow diagrams.

As can be seen in FIG. 7, this time a blade client 105 initiates the SCTP connection (i.e. association) to an outside server 145 by sending the INIT packet to load balancer 120 with the Initiate Tag value as V_Tag_Blade_i, which is the blade ID of blade "i" 105 (operation 705). From a load balancer's point of view, load balancer 120 continues with standard packet processing/forwarding procedures of the packet received from blade "i" 105 (operation 710). The first packet from outside server 145 on the connection destined towards blade client 105 via load balancer 120 is a non-init packet (operation 715). The packet is an INIT ACK packet to acknowledge the request from blade client 105 to initiate a new connection. In the INIT ACK packet, the Blade ID V_Tag_Blade_i is already embedded in the verification tag. Load balancer 120 extracts the Blade ID from the verification tag and forwards the packet accordingly. The COOKIE ECHO and COOKIE ACK packets are transmitted between blade client 105 and outside server 145 in opposite directions from the blade server 105 and client 130 in FIG. 6 (operations 720, 725, 730). Outgoing packets from blade client 105 towards outside server 145 include the verification tag of V_Tag_OutServ and incoming packets from outside server 145 towards blade client 105 include the verification tag of blade client 105's Blade ID, V_Tag_Blade_i. On the established connection between blade client 105 and outside server 145, outside server 145 sends data packets with the verification tag, V_Tag_Blade_i, and load balancer 120 is able to forward the packets to the appropriate blade by extracting the Blade ID from the verification tag field without keeping any state table (operations 735, 740, 745, 750).

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a load balancing site for stateless and dynamic load balancing of Stream Control Transmission Protocol (SCTP) data packets between a plurality of blades of the load balancing site and devices external to the load balancing site, wherein the plurality of blades are acting as one or more of clients and servers, wherein each of the plurality of blades has a blade identifier (ID) that uniquely identifies its location for routing purposes to a load balancer of the load balancing site, the method comprising the steps of:

during establishment of server connections between different ones of the plurality of blades and the devices external to the load balancing site, each of the plurality of blades choosing for its SCTP verification tag a value that at least identifies its blade ID, wherein the SCTP verification tag is for verifying packets from a client to a server and also identifies the blade by way of the blade ID to the load balancer for routing the SCTP data packets of the server connections; and responsive to the SCTP data packets from the devices external to the load balancing site sent on established server connections, the load balancer performing the following on those packets:

determining from the SCTP verification tags in the SCTP data packets the blade IDs; and forwarding each of the SCTP data packets to one of the plurality of blades according to the blade IDs, wherein reading the blade ID in the data packet to forward the data packet allows the load balancer to avoid storing and referencing a mapping table for routing the data packets of the server connections to the servers, wherein responsive to a failure of the load balancer, the load balancer performing the following step:

relinquishing all packet routing tasks to a backup load balancer in the load balancing site, wherein the backup load balancer takes over all subsequent packet routing tasks of the load balancer, wherein the backup load balancer continues packet routing immediately because the backup load balancer does not need to receive state information from the load balancer for the packet routing.

2. The method of claim 1, wherein the plurality of blades are collectively assigned one IP (Internet Protocol) address so that the plurality of blades appears to the devices external to the load balancing site as only a single node.

3. The method of claim 1, wherein the SCTP verification tag is a set of bits such that at least part of the set of bits represents the blade ID and remaining bits of the set of bits form a random value.

4. The method of claim 1, wherein during the establishment of the server connections:

responsive to the devices external to the load balancing site initiating requests for the server connections, the plurality of blades performing the following step:

inserting its blade ID into the SCTP verification tag of an SCTP acknowledgement packet in response to the request; and responsive to the plurality of blades of the load balancing site initiating requests for the server connections, the plurality of blades performing the following step:

inserting its blade ID into an SCTP initiate tag of an SCTP initialization packet that requests the server connections with outside servers external to the load balancing site.

5. A method in a load balancer of a load balancing site for stateless and dynamic load balancing of packets between a plurality of clients and a plurality of server applications, wherein the plurality of server applications are hosted on a plurality of blades of the load balancing site, the method comprising the steps of:

receiving the packets from the plurality of clients;

distinguishing the packets sent by the plurality of clients that contain requests to initiate server connections from those that are on established server connections;

for each of the packets sent by the plurality of clients that contain a request to initiate a server connection, performing the following steps:

identifying a current load on each of the plurality of blades;

selecting from the plurality of blades a currently selected blade for the server connection based on the current load on each of the plurality of blades, wherein the currently selected blade is selected so as to more evenly distribute traffic among the plurality of blades and avoid overloading any particular blade of the plurality of blades;

forwarding the packet to the currently selected blade; and receiving an acknowledgment packet from the currently selected blade that contains an acknowledgement of the request to initiate the server connection and an identification tag inserted by the blade, wherein the identification tag contains at least in part a blade identification (blade ID) which identifies to the load balancer which blade of the plurality of blades is hosting the server connection for currently selected blade;

forwarding the acknowledgment packet from the currently selected blade to a client that sent the request; and for each of the packets that are on established server connections and that are sent by the plurality of clients, performing the following steps:

reading from the identification tag in the packet the blade ID, wherein the client inserts in the packet the blade ID provided by the currently selected blade to which the server connection with the client was established; and forwarding the packet containing the blade ID to the currently selected blade according to the blade ID, wherein reading the blade ID from the packet to forward the packet to the blade corresponding to the blade ID allows the load balancer to avoid storing and referencing a mapping table to maintain load balancing for the server connections; and experiencing a failure and relinquishing all packet routing tasks to a backup load balancer in the load balancing site in response to the failure, wherein the backup load balancer takes over all subsequent packet routing tasks of the load balancer, wherein the backup load balancer continues packet routing immediately because the backup load balancer does not need to receive state information from the load balancer for the packet routing.

6. The method of claim 5, wherein the packets are transmitted according to Stream Control Transmission Protocol (SCTP) and the identification tags are the SCTP's verification tags chosen by the blades to which the server connections are being established, wherein the SCTP verification tag that normally is a random number selected by the server application and used by the server application for verifying subsequent packets in the server connections received from clients via the load balancer now also identifies the blade by way of the blade ID to the load balancer for routing the packets of the server connections to the blades.

7. The method of claim 6, wherein the SCTP verification tag is a set of bits such that at least part of the set of bits represents the blade ID and remaining bits of the set of bits form a random value.

8. The method of claim 5, wherein the plurality of blades are collectively assigned one IP (Internet Protocol) address so that the plurality of blades appears to the plurality of clients as only a single node.

9. The method of claim 5, wherein the plurality of blades additionally hosts a plurality of client applications.

10. The method of claim 9, further comprising the step of:
receiving a new packet from a client application in a blade of the plurality of blades, wherein the new packet contains a new request to initiate a new server connection with an outside server external to the load balancing site, a blade identification tag identifying the blade and an instruction to the outside server to utilize the blade identification tag for all subsequent packets for the new server connection.

11. A method in a blade of a load balancing site for stateless and dynamic load balancing of packets by a load balancer between a plurality of clients and a plurality of server applications, wherein the plurality of server applications are hosted on a plurality of blades of the load balancing site, the method comprising the steps of:
receiving the packets from the load balancer;
distinguishing the packets sent by the plurality of clients and forwarded by the load balancer that contain requests to initiate server connections from those that are on established server connections;
for each of the packets sent by the plurality of clients that contain a request to initiate a server connection, performing the following steps:
creating an acknowledgement packet that contains an acknowledgement of the request to initiate the server connection;
inserting an identification tag into the acknowledgement packet, wherein the identification tag contains at least in part a blade identification (blade ID) which uniquely identifies to the load balancer the blade of the plurality of blades that is hosting the server connection; and
sending the acknowledgement packet containing the identification tag to the load balancer, wherein the acknowledgement packet indicates to a client that the request from the client has been accepted and provides the client with the identification tag for all subsequent packets for the server connection, wherein the identification tag allows the load balancer to route packets based on the blade ID without maintaining a state table that maps which server connections are assigned to which blades, wherein the blade ID enables the following: responsive to a failure of the load balancer, the load balancer relinquishes all packet routing tasks to a backup load balancer in the load balancing site, wherein the backup load balancer takes over all subsequent packet routing tasks of the load balancer, wherein the backup load balancer continues packet routing immediately because the backup load balancer does not need to receive state information from the load balancer for the packet routing; and
for each of the packets that are on established server connections and that are sent by the plurality of clients, responding to the packet based on standard packet processing.

12. The method of claim 11, wherein the packets are transmitted according to Stream Control Transmission Protocol (SCTP) and the identification tags are the SCTP's verification tags chosen by the blades to which the server connections are being established, wherein the SCTP verification tag that normally is a random number selected by the server application and used by the server application for verifying subsequent packets in the server connections received from clients via the load balancer now also identifies the blade by way of the blade ID to the load balancer for routing the packets of the server connections to the blades.

13. The method of claim 11, wherein the identification tag is a set of bits such that part of the set of bits represents the blade ID and remaining bits of the set of bits form a random value.

14. The method of claim 11, further comprising the steps of:
creating an initialization packet that contains a new request to initiate a new server connection with an outside server external to the load balancing site, wherein the initialization packet contains the blade ID identifying the blade;
sending the initialization packet containing the blade ID to the load balancer, wherein subsequent packets from the outside server for the new server connection contain the blade ID and the load balancer routes the subsequent packets to the blade based on the blade ID, wherein the load balancer does not need to maintain a state table that maps which server connections are assigned to which blades.

15. A load balancer for use in a load balancing site for stateless and dynamic load balancing of packets between clients external to the load balancing site and server applications, wherein the server applications are hosted on blades in the load balancing site, the load balancer comprising:
one or more storage devices;
one or more processors coupled to the one or more storage devices, the one or more processors adapted to:
receive and process packets from the clients and the blades;
evaluate a plurality of loads on each of the blades when one of the clients sends a connection initialization packet to the load balancer that contains a request for a server connection, and select one of the blades to receive the connection initialization packet based on the plurality of loads, wherein load analysis at the load balancer more evenly distributes traffic among the blades and avoids overloading any particular blade; and
route the connection initialization packets received from the clients to the selected blades, and to route subsequent packets received from the clients for the initialized server connections according to blade identifications (blade IDs) in identification tags in the subsequent packets,
wherein responsive to a failure of the load balancer, the one or more processors are adapted to:
relinquish all packet routing tasks to a backup load balancer in the load balancing site, wherein the backup load balancer takes over all subsequent packet routing tasks of the load balancer, wherein the backup load balancer continues packet routing immediately because the backup load balancer does not need to receive state information from the load balancer for the packet routing.

16. The load balancer of claim 15, wherein the blades are collectively assigned one IP (Internet Protocol) address, wherein the blades appear to the clients as only a single node.

17. The load balancer of claim 15, wherein the data packets are transmitted according to Stream Control Transmission Protocol (SCTP) and the identification tags are the SCTP's verification tags chosen by the blades to which the server connections are being established, wherein the SCTP verification tag that normally is a random number selected by the server application and used by the server application for verifying subsequent packets in the server connections received from clients via the load balancer now also identifies the blade by way of the blade ID to the load balancer for routing the packets of the server connections to the blades.

18. A blade for use in a load balancing site for stateless and dynamic load balancing of packets between clients external to the load balancing site and server applications, wherein the server applications are hosted on blades in the load balancing site, the blade comprising:
   one or more storage devices;
   one or more processors coupled to the one or more storage devices, the one or more processors adapted to:
   receive and process incoming packets;
   create outgoing packets containing an identification tag in response to the incoming packets containing a request for a server connection, wherein the outgoing packets include acknowledgement packets that indicates that requests from clients to initiate server connections have been accepted;
   add to the identification tag in each of the acknowledgement packets a blade identification (blade ID) that identifies the blade and that the clients will utilize for all subsequent packets for the server connections, wherein the blade ID allows the load balancer to route the packets to the blade without maintaining a state table that maps which server connections are assigned to which blade, wherein the blade ID enables the following: responsive to a failure of the load balancer, the load balancer relinquishes all packet routing tasks to a backup load balancer in the load balancing site, wherein the backup load balancer takes over all subsequent packet routing tasks of the load balancer, wherein the backup load balancer continues packet routing immediately because the backup load balancer does not need to receive state information from the load balancer for the packet routing; and
   send the outgoing packets to the clients via the load balancer.

19. The blade of claim 18, wherein the one or more processors are further adapted to:
   create initialization packets from client applications hosted on the blades to request outside server connections with outside servers external to the load balancing site and to insert the identification tag containing the blade ID in the initialization packets and an instruction to the outside servers to utilize the identification tag for all subsequent packets for the outside server connections, wherein any packet identified by the identification tag incoming towards the blade is routed to the blade by the load balancer, allowing packet routing to be performed in a stateless and dynamic manner.

20. The blade of claim 18, wherein the packets are transmitted according to Stream Control Transmission Protocol (SCTP) and the identification tags are the SCTP's verification tags chosen by the blades to which the server connections are being established, wherein the SCTP verification tag is normally a random number selected by a server and used by the server for verifying subsequent packets in the server connections received from clients via the load balancer but also now identifies the blade by way of the blade ID to the load balancer for routing the packets of the server connections and the outside server connections.

21. The blade of claim 18, wherein the blades are collectively assigned to one IP (Internet Protocol) address, wherein the blades appear to the clients and the outside servers as only a single node.

* * * * *

UNITED STATES PATENT AND TRADEMARK OFFICE
CERTIFICATE OF CORRECTION

| | | |
|---|---|---|
| PATENT NO. | : 8,549,146 B2 | Page 1 of 1 |
| APPLICATION NO. | : 12/695957 | |
| DATED | : October 1, 2013 | |
| INVENTOR(S) | : Stanisic et al. | |

It is certified that error appears in the above-identified patent and that said Letters Patent is hereby corrected as shown below:

On the Title Page, in item (73), under "Assignee", in Column 1, Line 2, delete "Sweken" and insert -- Sweden --, therefor.

In the Specifications

In Column 4, Line 27, delete "System)." and insert -- System)). --, therefor.

In Column 5, Line 40, delete "(VPLS))." and insert -- (VPLS))). --, therefor.

In Column 7, Line 37, delete "meaning" and insert -- meaning. --, therefor.

Signed and Sealed this
Fifteenth Day of April, 2014

Michelle K. Lee
*Deputy Director of the United States Patent and Trademark Office*